United States Patent
Nakai

(10) Patent No.: US 8,027,176 B2
(45) Date of Patent: Sep. 27, 2011

(54) SWITCHING POWER SUPPLY CIRCUIT

(75) Inventor: Koichi Nakai, Saitama-ken (JP)

(73) Assignee: K A C Japan Co., Ltd., Saitama-ken (JP)

( * ) Notice: Subject to any disclaimer, the term of this patent is extended or adjusted under 35 U.S.C. 154(b) by 407 days.

(21) Appl. No.: 12/287,421

(22) Filed: Oct. 8, 2008

(65) Prior Publication Data

US 2010/0085780 A1    Apr. 8, 2010

(51) Int. Cl.
    *H02M 3/335* (2006.01)
(52) U.S. Cl. ..................................... 363/21.16
(58) Field of Classification Search ............... 363/21.08, 363/21.12–21.17
See application file for complete search history.

(56) References Cited

U.S. PATENT DOCUMENTS

| | | | |
|---|---|---|---|
| 4,486,822 A * | 12/1984 | Marinus | 363/19 |
| 4,649,464 A * | 3/1987 | Shono | 363/21.16 |
| 5,978,235 A * | 11/1999 | Lampinen | 363/21.16 |
| 5,995,385 A * | 11/1999 | Shimamura | 363/21.16 |
| 6,529,392 B2 * | 3/2003 | Nishida et al. | 363/21.16 |
| 7,123,488 B2 * | 10/2006 | Hirabayashi et al. | 363/21.16 |

OTHER PUBLICATIONS

"Jitsuyo Dengen Kairo Sekkei Handbook" 5 pages Handbook for Design of Practical Power Supply Circuit Issue of first edition: May 20, 1988 copyright Jiro Togawa 1988 Issue of 17th edition: Mar. 1, 1999 Author: Jiro Togawa; Publisher: Yoshiharu (Ryoji) Gamo; Publication place: CQ Publication Co.

* cited by examiner

*Primary Examiner* — Jue Zhang
(74) *Attorney, Agent, or Firm* — Jordan and Hamburg LLP

(57) ABSTRACT

In a RCC type switching power supply circuit, a sensing coil connected magnetically closely with an output coil is equipped in a fly-back transformer. The sensing coil is connected with a timing condenser through a Zener diode and an alternate current voltage output from the sensing coil is rectified and smoothed. Then, the difference between a detection voltage detected as a direct current voltage of the secondary side and the basic voltage of the Zener diode is supplied to the timing condenser to change the discharge/charge time and then change the timing of the switching of a first switching element in order to control the switching time of the first switching element. At the same time, applying the voltage which results from rectifying and smoothing the output voltage from the sensing coil, the charge and discharge of the timing condenser at the non-loading time is controlled in order to prolong the cycle of the switching oscillation and consequently, reduce the power loss.

4 Claims, 12 Drawing Sheets (a)

(b)

(c)

PRIOR ART

PRIOR ART

PRIOR ART

PRIOR ART

PRIOR ART

PRIOR ART

SWITCHING POWER SUPPLY CIRCUIT

TECHNICAL FIELD

This invention relates to a switching power supply circuit with a relatively low output of 50 W or less which approximates the output voltage and current properties of linear AC adopters as shown in FIG. 5 and which enables to reduce a power loss at a non-loading time (while a slight current runs) and be provided with a cheap price.

BACKGROUND ART

FIG. 5 shows an initial direct-current power supply circuit called linear AC adopter. In FIG. 5, a commercially available alter later voltage Vi input into the part between a AC input terminal 10 and 11 is converted to a prescribed voltage at a transformer 12, rectified at a full-wave rectifier 13, and smoothed at a smoothing condenser 14. Then, a direct-current voltage Vo and direct-current Io are supplied to a load 17 through direct-current output terminals 15 and 16.

In the simple and cheap power supply circuit of direct current called linear AC adopter shown in FIG. 5, when the input alternate-current voltage Vi fluctuates, the output voltage Vo varies according to the input voltage, such as V1, V2, and V3 show in FIG. 6. A particular problem is that when the output direct-current increases, the output voltage Vo tends to gradually decrease. Consequently, among loads 17 for commercially available electronic devices, many devices are designed to adjust to the property that the output voltage Vo decreases gradually with the increase of the output direct-current Io.

Recently, among direct-current power supply circuits with a relatively low output of 50 W or less, RCC (Ringing Choke Converter) type switching power supply circuits shown in FIG. 7 have been being used in place of those shown in FIG. 5.

In FIG. 7, when a direct-current voltage rectified an AC voltage is applied to a part between a plus side terminal 18 and a minus side terminal 19, a voltage of threshold level or less is applied immediately at a gate of a first switching element 22 with MOS•FET through a starting resistance. Then, a slight drain current runs at the first switching element 22, by which a voltage is generated at a magnetizing coil 25 of a fly-back transformer 24. A voltage is then induced at a drive coil 27. The voltage generated at the drive coil 27 is loaded on the gate of the first switching element 22 through resistances 31 and 33 and a condenser 34, by which a positive feedback loop is formed and the first switching element 22 turns on immediately at t1, as shown in FIG. 8 ($a$). At that time, a voltage Vds between the drain and source of the first switching element 22 becomes 0 as shown in FIG. 8 ($a$). With the on-state of the first switching element 22, a voltage approximately equivalent to a direct-current voltage applied to the part between the plus side terminal 18 and the minus side terminal 19 is applied to the fly-back transformer 24 and a voltage Vd determined by the coil-winding number ratio of a output coil 26 to the winding number of the magnetizing coil 25 as shown in FIG. 8 ($d$) is generated at the drive coil 27.

The voltage Vd generated at the drive coil 27 induces a start to charge up a condenser 28 through a resistance 31 and a light-sensitive element 46 of a photo-capra 32. When a voltage Vc charged at the condenser 28 becomes a wave shape as shown in FIG. 8 ($e$) and the voltage Vc reaches a voltage Vbe between the base and emitter of the second switching element 23 at t2, a base current runs at the second switching element 23 to turn on. With the on-state of the second switching element 23, the voltage between the gate and source of the first switching element 22 becomes approximate zero and the first switching element 22 thus turn off immediately. During the t1~t2 period from the on-state to the off-state of the fist switching element 22, as shown in FIG. 8 ($b$), a current Id runs at the magnetizing coil 25.

When the first switching element 22 turn off at t2, simultaneously, a voltage inverting for positive or negative states to that of the magnetizing coil 25 side is generated at the output coil 26 of the secondary side. This voltage is rectified at a rectifier diode 40 and smoothed at a smoothing condenser 41 and then supplied to the load 17. At that time, the current Io running at the output coil 26 is shown in FIG. 8 ($c$). The current Io rapidly increases and subsequently decreases gradually toward zero until the rectifier diode 40 turns off. Simultaneously, at t3 when the rectifier diode 40 turns off, the inverted voltage Vd as shown in FIG. 8 ($d$) is generated at the drive coil 27 by residual magnetic flux inside the output coil 26 and the first switching element 22 then turns on again. During the time, the condenser 28 is charged up with the negative state by the voltage Vd inverting through the resistance 29 and a Zener diode 30. An output voltage is obtained by the repetitive oscillation operation.

The output voltage Vo detected at a resistance 48 is compared with a basic voltage V ref of the Zener diode 47. When the output voltage Vo exceeds the basic voltage V ref, the difference runs at light-emitting element 45 of the photo-capra 32. Because this then changes an impedance between a collector and emitter of a light receiving element 46 of the photo-capra 32, the outcome changes a time constant resulting from the resistance, the light receiving element 46 of the photo-capra 32 and the condenser 28, all of which are on the route for charging the condenser 28 during the on-state of the first switching element 22. Consequently, the condenser voltage Vc changes with the output voltage Vo. That is, higher the output voltage Vo, earlier the condenser voltage Vc reaches the Vbe, and conversely, lower the output voltage Vo, slower the condenser voltage Vc reaches the Vbe. When the condenser voltage Vc reaches the Vbe, the second switching element 23 turns on and the first switching element 22 turns off. The changed time constant then changes the time until the Vc reaches the Vbe and the on-state period of the first switching element 22 is then controlled to stabilize the output voltage Vo.

In FIG. 7, to prevent a high-spike voltage generated under a transient condition of the switching in the switching power source, a snubber circuit consisting of a diode 35, a condenser 36, and a resistance 37 is connected in parallel to the magnetizing coil 25.

PROBLEMS TO BE SOLVED BY THE INVENTION

The power supply circuit shown in FIG. 7 is complex in comparison with the direct-current power supply circuit shown in FIG. 5. However, as in the property diagram as shown in FIG. 9, even if the commercially available input alternate-current voltage Vi fluctuates, the output voltage Vo is adjustable to become approximately constant such as V1, V2 and V3. Moreover, even if the output current Io increases, the output voltage Vo is adjustable to become constant with almost no variation. Because the transmitting frequency is very high, several dozen to several hundred kHz, especially, the transformer is made with a very compact size, and the whole formation is thus made with a compact size.

However, among commercially available loads 17, in accordance with the increase of the output direct current Io, many loads are designed to adjust to the property of prior-type direct-current power supply circuits through which an direct-current output voltage decreases gradually. Because of that, when a switching power supply circuit as shown in FIG. 7 is used in place of the prior type direct-current power supply circuit as shown in FIG. 5, the load 17 may not operate normally.

The switching power supply circuit shown in FIG. 7 is configured as such that when the output voltage Vo exceeds the basic voltage Vref, a current runs at the light emitting element 45 of the photo-capra 32 to emit light, which the light-receiving element 46 receives to change the time constant resulting from the resistance 31, the light receiving element 46, and condenser 28. Because of the configuration, as a particular problem, expensive elements such as the photo-capra 32 and a detection circuit of the output voltage Vo are required. In addition, even with a non-load that the output current approximates OA, as shown in FIGS. 10 (a) and (b), because the first switching element 22 operates continuously with the on/off state by high frequencies, the switching loss per unit time is so large that the electric loss cannot be controlled.

DISCLOSURE OF THE INVENTION

The object of this invention is to provide a cheap and compact switching power supply circuit with properties equivalent to the prior direct-current power supply circuit as shown in FIG. 5 and with a reduced power loss at a non-loading time when the output current approximates OA.

The switching power supply circuit in the invention is characterized in that the equipments are the first switching element 60 comprising the fly-back transformer 62 with a magnetizing coil 63 and a drive coil 65 at the primary side and a output coil 64 at the secondary side and a bipolar transformer self-oscillating when a voltage is applied from said drive coil 65 and magnetizing said magnetizing coil 63, the second switching element 54 comprising the bipolar transformer controlling the switching time of the first switching element 60, and the timing condenser 55 connected between the base and emitter of the second switching element 54 and supplied a current from said drive coil 65 through the impedance circuit; and a direct-current voltage rectified an AC voltage is supplied to said magnetizing coil 63 and output from said output coil 64 by switching; a sensing coil 66 is connected magnetically closely with said output coil 64 and then connected with said timing condenser 55 through the Zener diode 56; the difference between a detection voltage generated at the condenser 58 rectifying and smoothing an alternate current voltage output from said sensing coil 66 and detecting it as a direct-current voltage of the secondary side and the basic voltage of said Zener diode 56 is supplied to said timing condenser 55 to change the discharge and charge time and then change the timing for switching of said second switching element 54, which leads to control the switching time of said first switching element 60.

The impedance circuit connected with the timing condenser 55 can change its properties related to its output voltage and output current, depending on each case of the circuit with the resistance 53; one connected in series with the parallel circuit of the resistance 53, a resistance 67 and a condenser 68; one with a serial circuit of the resistance 53 and an inductance 69 or others.

At the non-loading time when the output current approximates OA, a detection voltage generated at the condenser 58 is supplied to the timing condenser 55 with a current through the resistance 57 and the Zener diode 56. During the off-state of the first switching element 60 (The base of the first switching element 60 is 0V or less), the base voltage of the second switching element 54 increases to Vbe's threshold or higher to turn on. The base voltage of the first switching element 60 becomes almost 0V and the off-state of the first switching element 60 is maintained and as shown in FIGS. 11 (a) and (b), the on/off repetitive frequency of the second switching element 54 becomes so small that the power loss per unit time due to the switching loss can be reduced.

This invention is suitable for AC adopters used for loads of commercially available electronic devices designed to adjust to the property that the output voltage Vo decreases gradually with the increase of the output direct current Io. The feedback at the primary side becomes unnecessary by means of the photo-capra, the detection circuit of the output voltage Vo and others, and the insulation between the primary and secondary sides is facilitated. Moreover, highly expensive elements are not required and the products can be provided with cheaper prices. Because the transmitting frequency is very high, several dozen to several hundred kHz, particularly, the transformer can become very compact and consequently, the whole formation can become compact.

At the non-loading time when the output current approximates 0 A, the on/off repetitive frequency of the second switching element becomes so small that the power loss per unit time due to the switching loss can be reduced.

As for the impedance circuit connected with the timing condenser, the property that the output voltage Vo decreases gradually with the increase of the output direct current can be adjusted arbitrarily by use of a resistance, use of serial connection of resistances and the parallel circuit consisting of resistances and condensers, or use of serial circuit of resistances and inductances.

BEST MODE FOR CARRYING OUT THE INVENTION

Figure 1:
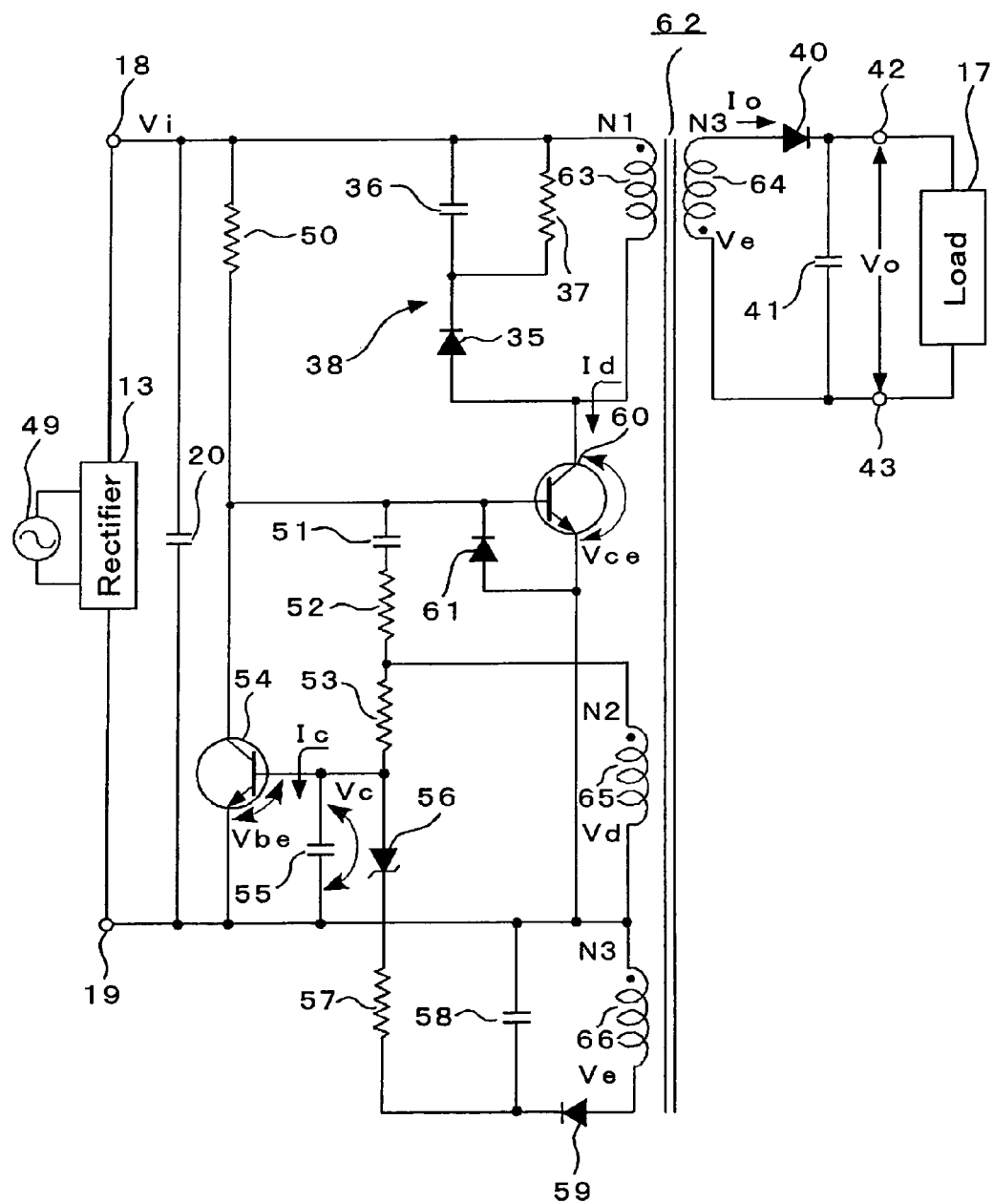
FIG. 1 shows a diagram of an electric circuit in an embodiment case of the switching power supply circuit of the invention.

The switching power supply circuit of the invention comprises the first switching element 60 having the fly-back transformer 62 with the magnetizing coil 63 and the drive coil 65 at the primary side and the output coil 64 at the secondary side and the bipolar transistor self-oscillating when a voltage is applied from said drive coil 65 and then magnetizing said magnetizing coil 63, the second switching element 54 with the bipolar transistor controlling the switching time of the first switching element 60, and the timing condenser 55 connected between the base and emitter of the second switching element 54 and supplied a current from said drive coil 65 through the impedance circuit; adopts RCC type in which a direct-current voltage rectified an AC voltage is supplied to said magnetizing coil 63 and output from said output coil 64 by switching; and equips the sensing coil 66 connected magnetically closely with said output coil 64 in said flyback transformer 62. The sensing coil 66 is connected with said timing condenser 55 through the Zener diode 56 and a difference between a detection voltage detected as a direct-current voltage of the secondary side which is rectified an alternate current voltage output from said sensing coil 66 and smoothed and the basic voltage of said Zener diode 56 is supplied to said timing condenser 55 to change the discharge and charge time and then change the timing of the switching of said second switching element 54, which consequently, controls the switching time of said first switching element 60.

The impedance circuit connected with the timing condenser 55 is adjustable arbitrarily for the property that the output voltage Vo decreases gradually with the increase of the output direct current Io, depending on the circuit case of only the resistance 53, the case of the serial connection of the resistance 53 and the parallel circuit consisting of the resistance 67 and the condenser 68, the case of the serial circuit of the resistance 53 and the inductance 68 and others.

The sensing coil 66 connected magnetically closely with said output coil 64 is equipped in said fly-back transformer 62. The rectifying and smoothing circuit is connected with the sensing coil 66 and then connected with said timing condenser 55 through the Zener diode 56 placed in the reverse direction to the resistance 57. The discharge and charge property of said timing condenser 55 is adjusted by the resistance 57 connected in series with said Zener diode 56 in such a manner that the timing time for said second switching element 54 to turn on becomes shorter at the non-loading time than at the ordinary switching time.

The discharge and charge property of the timing condenser is adjustable by a voltage of the Zener diode, the resistance connected in series with the Zener diode and the time constant determined by the content of the timing condenser.

Based on the following drawings, embodiment 1 is explained in detail.

In FIG. 1 showing embodiment 1 of the switching power supply circuit of the invention, commercially available AC power source 49 is rectified by the rectifier 13 and the direct-current power is supplied to the part between the plus terminal 18 and the minus terminal 19. In the part between these terminals 18 and 19, the serial circuit with the smoothing condenser 20, the starting resistance 50 and the second switching element (bipolar transistor) 54 and the serial circuit with the magnetizing coil 63 of the fly-back transformer 62 and the first switching element (bipolar transistor) 60 are connected in parallel mutually. The base of said first switching element 60 is connected with a connection point between said starting resistance 50 and the collector of the second switching element 54, with one edge of the condenser 51 and with the cathode of the diode 61 whose anode is connected with the emitter of the first switching element 60. Another edge of said condenser 51 is connected with the minus side terminal 19 through the resistance 52 and the charge resistance 53 as the impedance circuit and the timing condenser 55. The connection point between said charge resistance 53 and the timing condenser 55 is connected with the base of said second switching element 54 and the anode of the Zener diode 56.

In said fly-back transformer 62, the output coil 64, the drive coil 65 and the sensing coil 66 in addition to said magnetizing coil 63 are equipped. Particularly, in the invention, said output coil 64 and the sensing coil 66 are connected magnetically closely with homopolarity. The connection point between said drive coil 65 and the sensing coil 66 is connected with said minus side terminal 19 and one edge of the smoothing condenser 58. Another edge of said drive coil 65 is connected with the connection point between said resistance 52 and the charge resistance 53. Another edge of said sensing coil 66 is connected with the anode of a wave-detection diode 59 and the cathode of the wave-detection diode 59 is connected with another edge of said smoothing condenser 58 and also with the cathode of said Zener diode 56 through the resistance 57.

One edge of the output coil 64 of said fly-back transformer 62 is connected with one edge of the smoothing condenser 41 through the rectifying diode 40 and also with one edge of the load 17 through the output terminal 42. Another edge of said output coil 64 is connected with another edge of said smoothing condenser 41 and also with another edge of said load 17 through another output terminal 43.

To prevent a high spike voltage generated under a transient condition of the switching in the switching power source, the snubber circuit 38 consisting of the diode 35, the condenser 36 and the resistance 37 is connected in parallel to said magnetizing coil 63.

In addition, the black spots of the magnetizing coil 63, the output coil 64, the drive coil 65, and the sensing coil 66 in the fly-back transformer 62 indicate starting points for winding.

Figure 2:
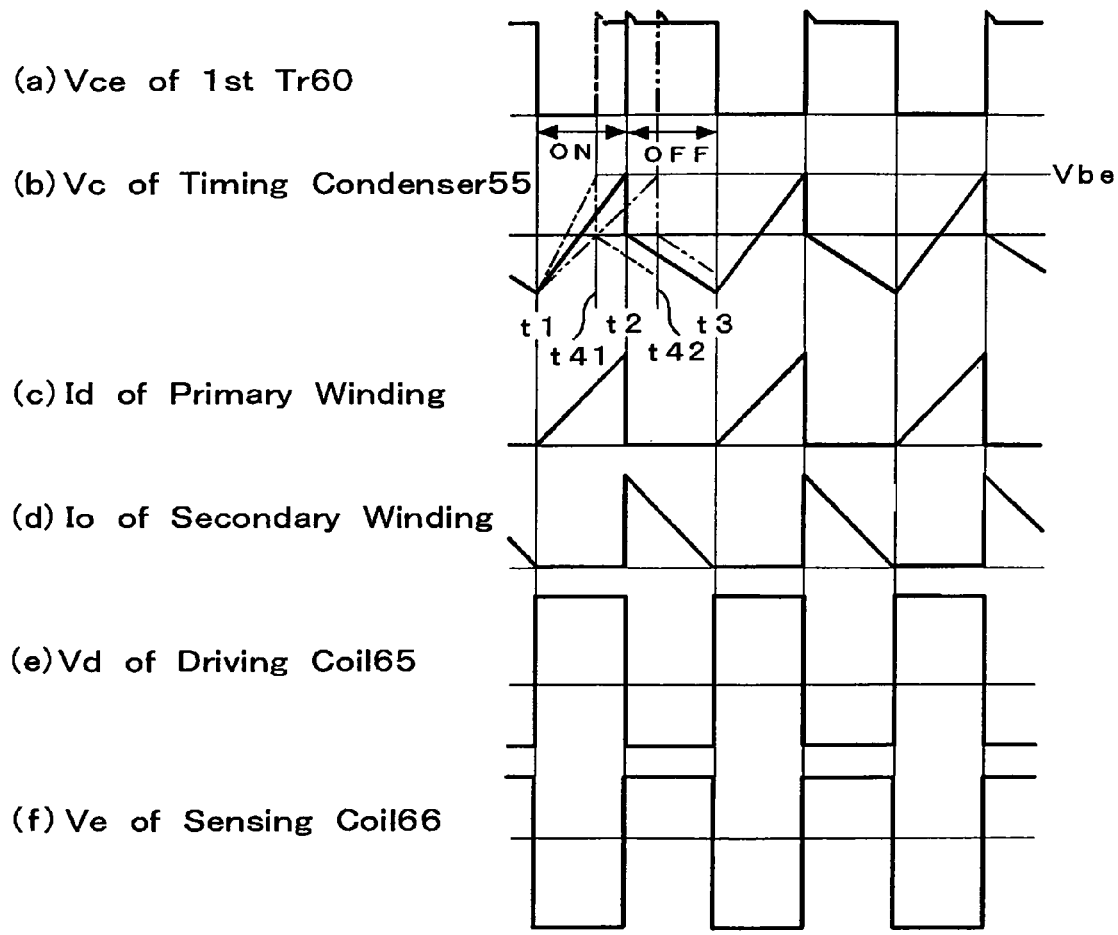
FIG. 2 shows an operating wave diagram of each part in FIG. 1.

Operations in such configurations are explained, based on FIGS. 1 and 2.

When a direct-current voltage is applied to the part between the plus side terminal 18 and the minus side terminal 19, a current runs at the base of the first switching element 60 through the starting resistance 50 to start the oscillation and immediately turn on the first switching element 60 at t1 as shown in FIG. 2. On the on-state of the first switching element 60, the voltage Vce between the collector and emitter of the first switching element 60 approximates 0V, as shown in FIG. 2 ($a$) and the voltage Vi equivalent to the voltage of the plus side terminal 18 is thus generated at the magnetizing coil 63. In the drive coil 65, when the winding number of the magnetizing coil 63 is made N1 and the winding number of the drive coil 65 is made N2, as shown in FIG. 2 ($e$), the voltage Vd of the voltage V1×N2/Ni times is generated. At the same time, as shown in FIG. 2 ($f$), the voltage Vi×N3/N1=Ve is generated in the output coil 64 and the sensing coil 66. However, the polarities in these coils 64 and 66 are reverse mutually and no current runs at the rectifying diode 40 and the wave-detection diode 59.

The voltage Vd generated at said drive coil 65 runs a current at the base of the first switching element 60 through the resistance 52 and the condenser 51 to maintain the on-state. At the same time, the timing condenser 55 is charged up through the charge resistance 53. When the voltage Vc of the timing condenser 55 as shown in FIG. 2 (*b*) reaches the Vbc of the second switching element 54, the second switching element 54 turns on at t2 and the base of the first switching element 60 connected with the collector of the second switching element 54 becomes a minus side potential of the minus side terminal 19 through the second switching element 54 and the first switching element 60 becomes the off-state.

At that time, the current Id running to the collector of the first switching element 60 and the magnetizing coil 63 becomes serriform waves as shown in FIG. 2 (*c*) by the first switching element's 60 changing from the on-state to the off-state.

When the first switching element 60 turns off at t2, the polarities in the magnetizing coil 63, the drive coil 65, the sensing coil 66 and the output coil 64 invert according to the fly-back principle and the output coil 64 thus supplies the current Io to the output side as shown in FIG. 2 (*d*). While the current Io is supplied, a voltage is generated at the magnetizing coil 63, as shown in FIG. 2 (*a*). At the drive coil 65, the voltage Vd as shown in FIG. 2 (*e*) is generated and the voltage Ve as shown in FIG. 2 (*f*) is generated at the sensing coil 66.

At t2 when the polarity of each voltage inverts according to the fly-back principle, immediately, the timing condenser 55 connected between the base and emitter of the second switching element 54 starts to charge in the reserve direction through the charge resistance 53 by the drive coil 65 whose voltage inverts, as shown in FIG. 2 (*b*). This condition persists until t3 when the voltage polarity of the drive coil 65 inverts again.

As shown in FIG. 2 (*c*), immediately after the current Id of the magnetizing coil 63 stops at t2, the magnetic energy accumulated at the magnetizing coil 63 becomes (½)·L·Id·Id (L is an inductance of the magnetizing coil 63) and is released through the rectifying diode 40 by the output coil 64 as the current Io does as shown in FIG. 2 (*d*). At the same time when the release is completed at t3, the current Io of the output coil 64 stops. Thus, according to the fly-back principle, immediately, all the coil polarities invert.

The base current runs to the first switching element 60 through the resistance 52 and the condenser 51 from the drive coil 65 and the first switching element 60 then turns on to return to the state at t1 as shown in FIG. 2. This as one cycle from t1 to t3 is repeated and the power of the output side is supplied to the load 17.

Figure 3:
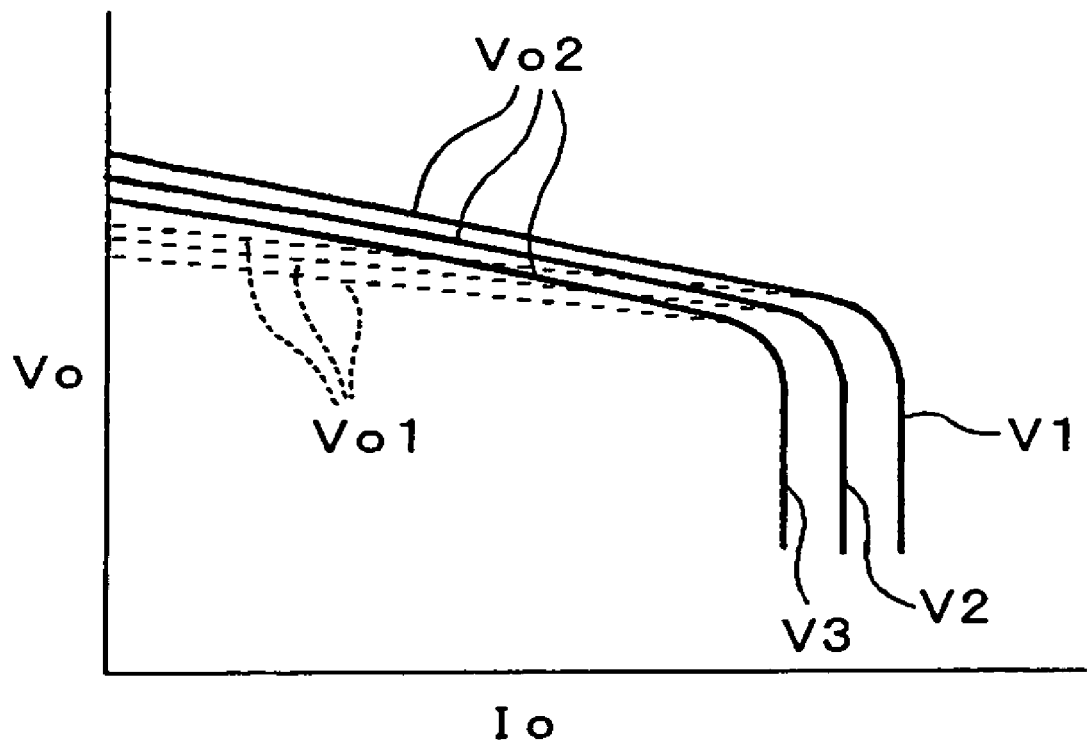
FIG. 3 shows a property diagram of the relationship between the output voltage and output current in the switching power supply circuit of the invention.

Next, a method for controlling the output voltage as shown in FIG. 3 is explained.

Figure 7:
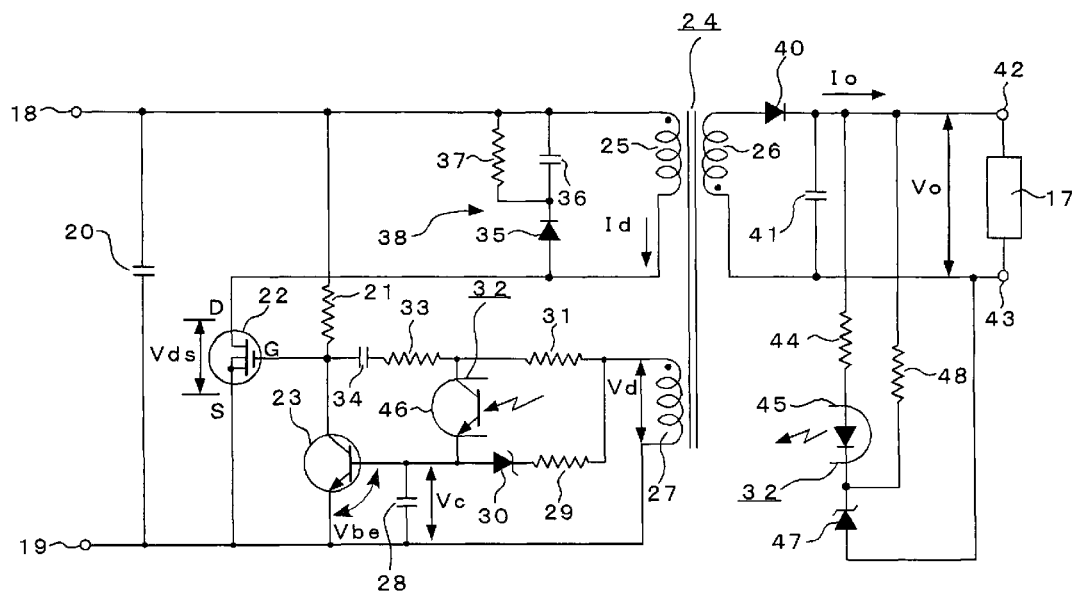
FIG. 7 shows a diagram of an electric circuit in prior RCC type switching power supply circuits.
Figure 8:
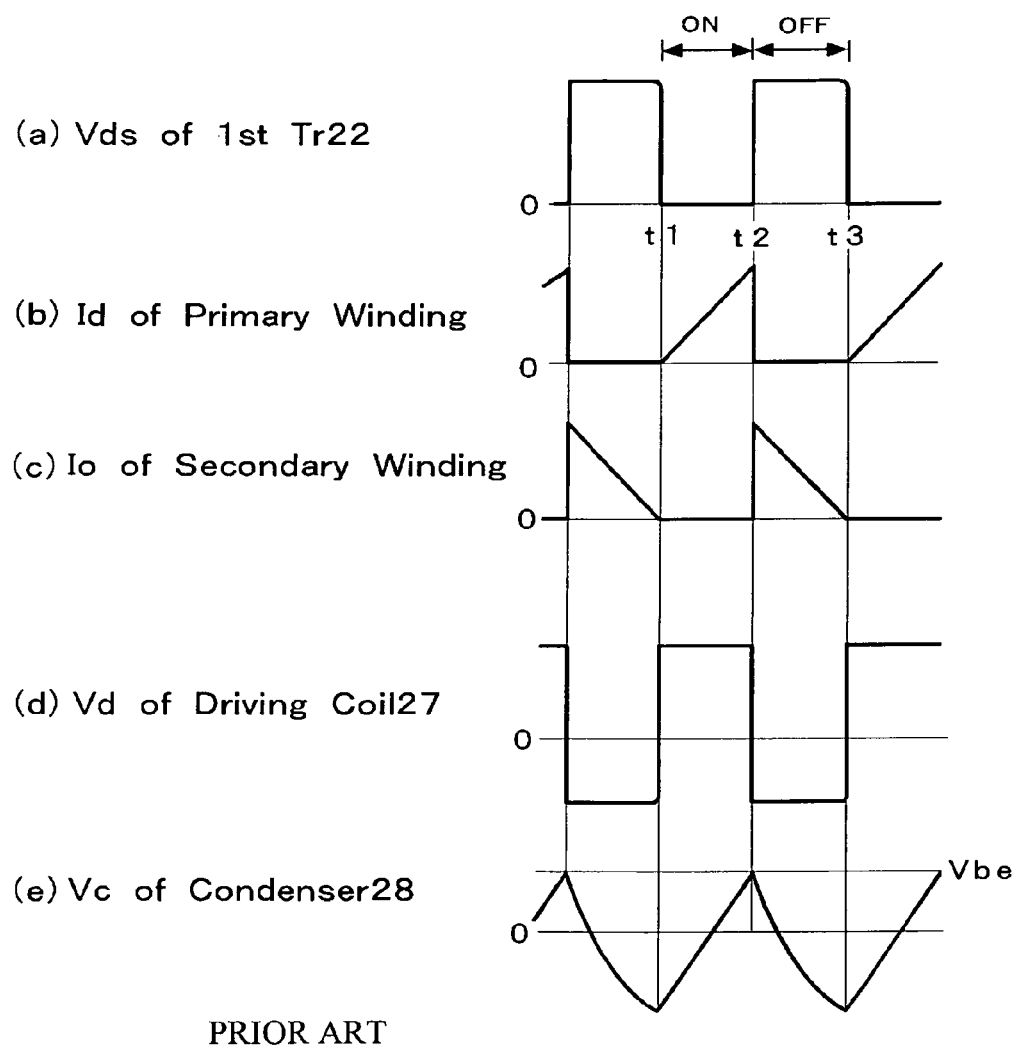
FIG. 8 shows a diagram of operating waves of each part in FIG. 7.
Figure 9:
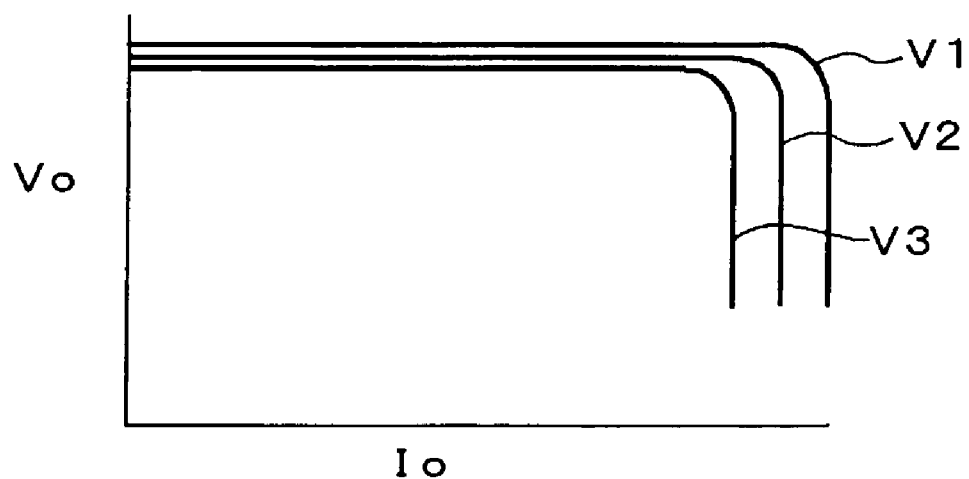
FIG. 9 shows a property diagram of the relationship between the output voltage and the output current in the switching power supply circuit in FIG. 7.
Figure 10:
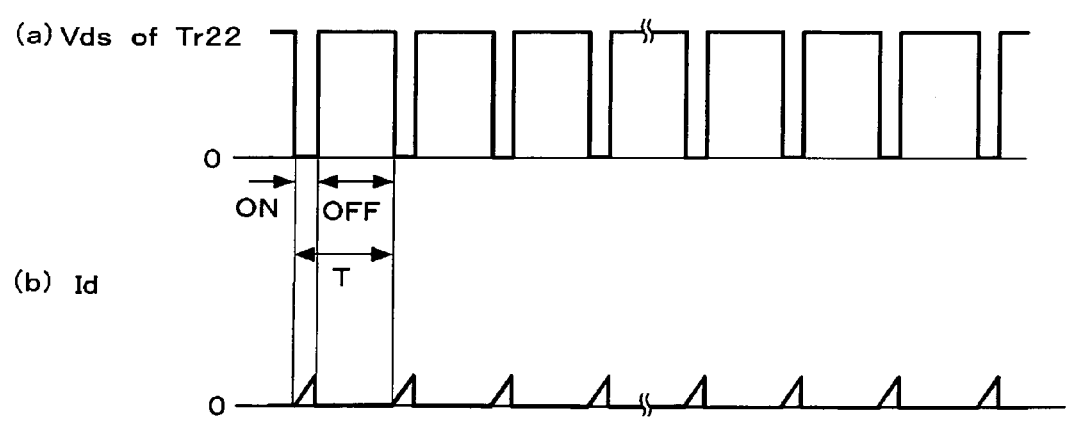
FIG. 10 shows a diagram of waves indicating oscillation conditions at the non-loading time of a prior switching power source in FIG. 7.
Figure 11:
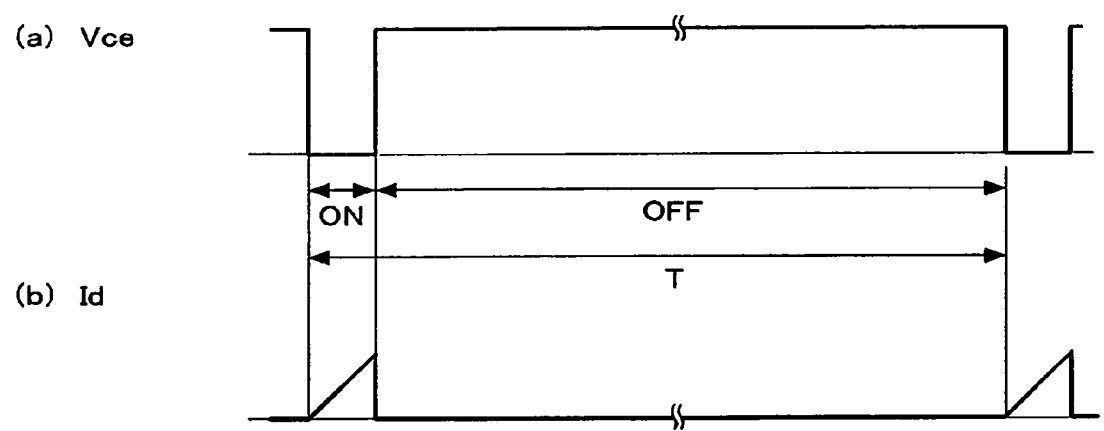
FIG. 11 shows a diagram of waves indicating oscillation conditions at the non-loading time of the switching power source in the invention.

The output voltage Vo results from rectifying the voltage Ve generated at the output coil 64 through the rectifying diode 40 and smoothing the Ve through the smoothing condenser 41. In the prior RCC type circuit as shown in FIG. 7, the output voltage Vo is detected directly at the output side and is made a feedback at the primary side by use of photo-capra 3 or others for controlling the output voltage Vo.

However, in this invention, the sensing coil 66 with homopolarity which is connected magnetically closely with the output coil 64 is equipped. As the voltage Ve generated at the sensing coil 66 approximates the voltage Ve generated at the output coil 64, the voltage Ve generated at the sensing coil 66 is rectified through the wave-detection diode 59 and smoothed through the smoothing condenser 58 to obtain a direct-current sensing voltage and detect it indirectly as the output voltage Vo, which is used for controlling the output voltage Vo.

For example, when the output voltage Vo exceeds the set level, as described above, the voltage Ve becomes so high that the direct-current voltage rectified at the diode 59 and smoothed at the condenser 58 from the sensing coil 66 is supplied to the timing condenser 55 through the resistance 57 and Zener diode 56 to increase the charge current Ic. Thus, the time until the charge voltage Vc of the timing condenser 55 reaches the Vbe voltage of the second switching element 54 becomes shorter as at t41 as shown with one-dot chain line in FIG. 2 (*b*). Consequently, the on-state period of the first switching element 60 becomes shorter and the output voltage Vo becomes lower.

Conversely, when the output voltage Vo becomes lower than the set level, the Zener diode 56 turns off to stop the charge current from the sensing coil 66 and charge from only the charge resistance 53 side. Thus, the time until the charge voltage Vc reaches the Vbe voltage of the second switching element 54 becomes longer as at t 42 as shown with two-dot chain line in FIG. 2 (*b*). Consequently, the on-state period of the first switching element 60 becomes longer and the output voltage Vo becomes higher.

As such, the charge time of the timing condenser 55 is controlled and the one time of the first switching element 60 is then controlled and the output voltage Vo is maintained constant.

As for the properties of the output voltage Vo and the output current Io of the switching power supply circuit, as shown in FIG. 3, the output voltage Vo decreases in accordance with the increase of the output current Io.

The reasons are because the voltage Ve generated at the sensing coil 66 is not accurately consistent with the voltage Vo rectified and smoothed the voltage Ve generated at the output coil 64 and when the current Io running at the load 17 side increases, the lowered voltage level resulting from the imperfection of the electromagnetic coupling between the sensing coil 66 and the output coil 64 and the impedance of the output line cannot be controlled. This invention applies this property with ingenuity.

The property that the output voltage Vo decreases in accordance with the increase of the output current Io as shown in FIG. 3 can be corrected such as Vo1 of the dot line and Vo2 of the solid line by means of the procedures that the charge resistance 53 is replaced with an impedance circuit network and the charge curve of the timing condenser 55 is changed. The details are explained, based on FIGS. 4 (*a*), (*b*) and (*c*).

Figure 4:
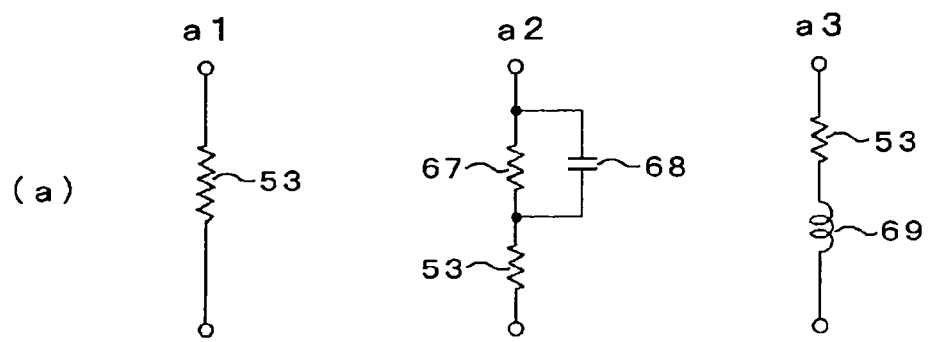
FIG. 4 shows a diagram of an electric circuit in a different case of the impedance circuit 53 in (a), a property diagram in a different case of the impedance circuit 53 in (b), and a property diagram of the relationship between the output voltage and the output current in a different case of the impedance circuit in (c).
Figure 4:
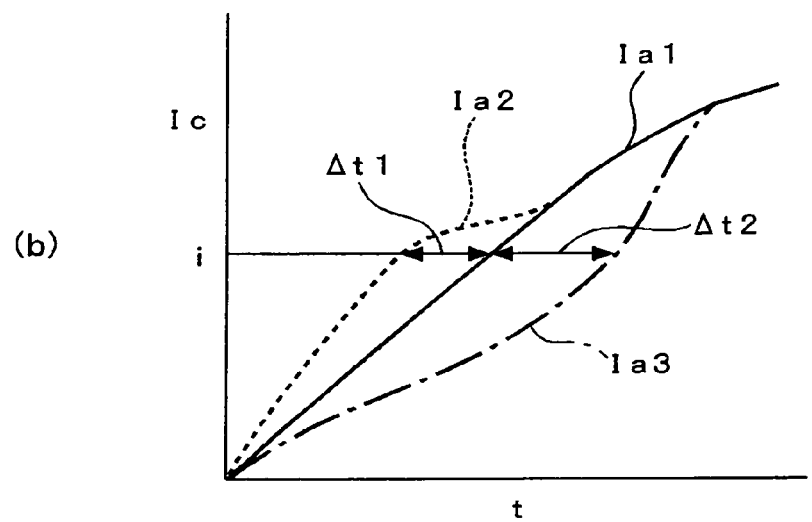
Figure 4:
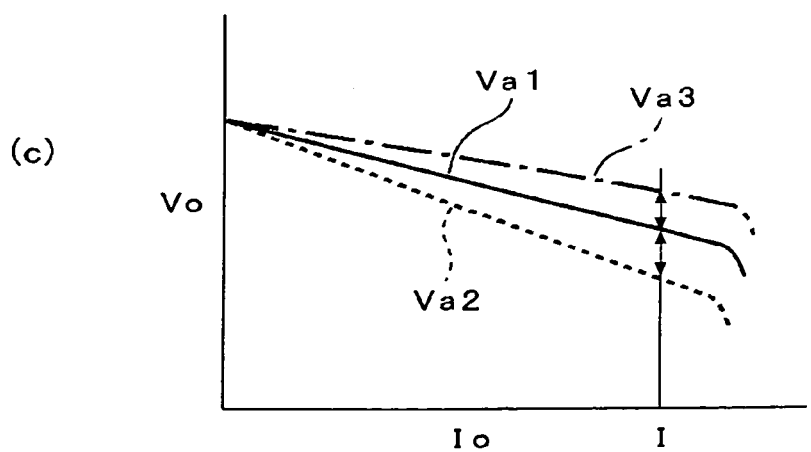
Figure 5:
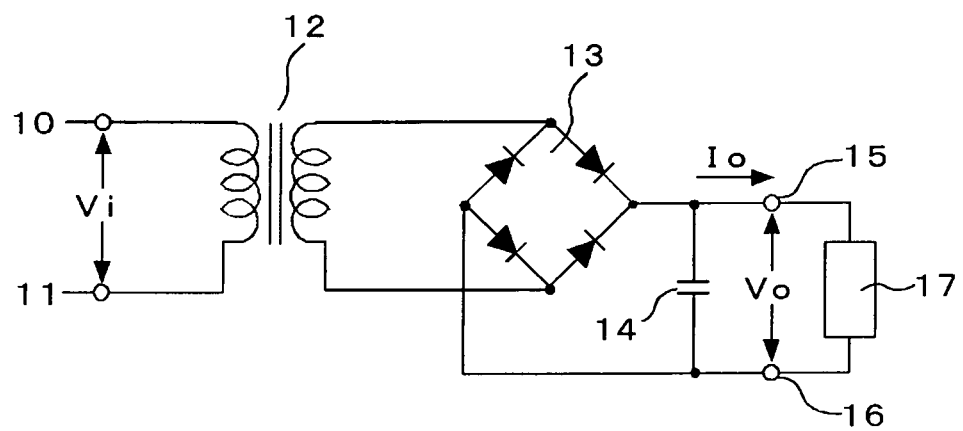
FIG. 5 shows a diagram of an electric circuit with a prior most simple AC adopter.
Figure 6:
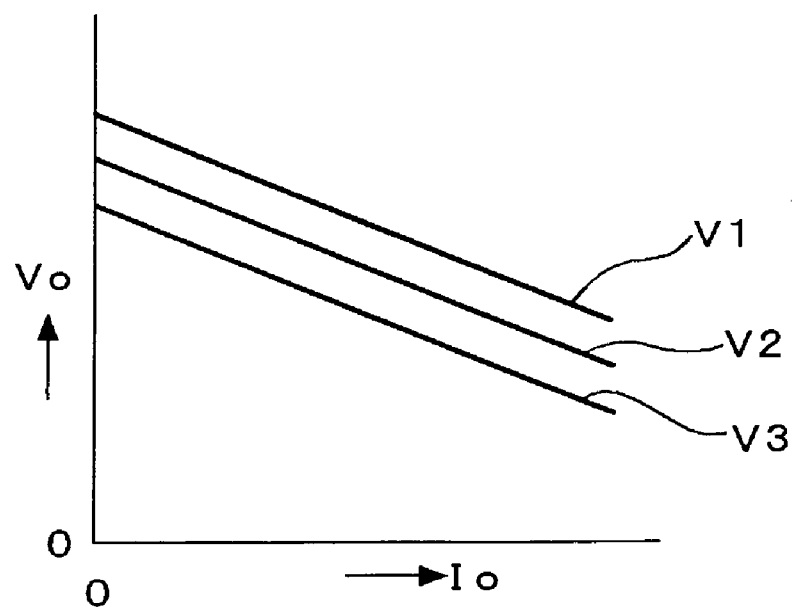
FIG. 6 shows a property diagram of the relationship between the output voltage and the output current in the circuit in FIG. 5.

In FIG. 4 (*a*), in the impedance circuit network,
(a1) indicates the case of only charge resistance 53.
(a2) indicates the case of serial addition of the parallel circuit with the resistance 53, the resistance 67 and the condenser 68.
(a3) indicates the case of serial addition of the inductance 69 to the resistance 53.

FIG. 4 (*b*) shows the charge current properties when the timing condenser 55 is charged through the circuit networks of the three types described above, in which the abscissa and the ordinate axes indicate the time and the current, respectively.

In FIG. 4 (*b*):
The solid line (Ia1) corresponds to said (a1).
The dot line (Ia2) corresponds to said (a2).
The one-dot chain line (Ia3) corresponds to said (a3).

FIG. 4 (*c*) shows the output voltage and current properties of the switching power supply circuit in the invention.

In FIG. 4 (c):
The solid line (Va1) corresponds to said (a1).
The dot line (Va2) corresponds to said (a2).
The one-dot chain line (Va3) corresponds to said (a3).
FIGS. 4 (a), (b) and (c) are explained furthermore in detail.

In FIG. 4 (b), in case of (Ia2) of the dot-line property, compared with (Ia1) of the solid line property, the time until the charge current Ic reaches the prescribed current level i becomes shorter by Δt1 and the time until the charge voltage Vc of the timing condenser 55 reaches the Vbe of the second switching element 54 also becomes shorter. Moreover, besides those, the on-state period of the first switching element 60 also becomes shorter. Consequently, the output voltage Vo decreases. As for the reduction, as shown in FIG. 4 (b), the Δt1 becomes higher in accordance with the increase of the charge time. This condition is the dot line property Va2 in FIG. 4 (c).

Similarly, in FIG. 4 (b), in case of (Ia3) of the one-dot chain line property, compared with (Ia1) of the solid line property, the time until the charge current Ic reaches the prescribed current level i becomes longer by Δt2 and the time until the charge voltage Vc of the timing condenser 55 becomes the Vbe of the second switching element 54 becomes longer. Besides those, the on-state of the first switching element 60 becomes longer. Consequently, the output voltage Vo increases. This condition is the one-dot chain line property in FIG. 4 (c). As such, the output voltage and current properties of the electric power source is adjustable arbitrarily.

Figure 12:
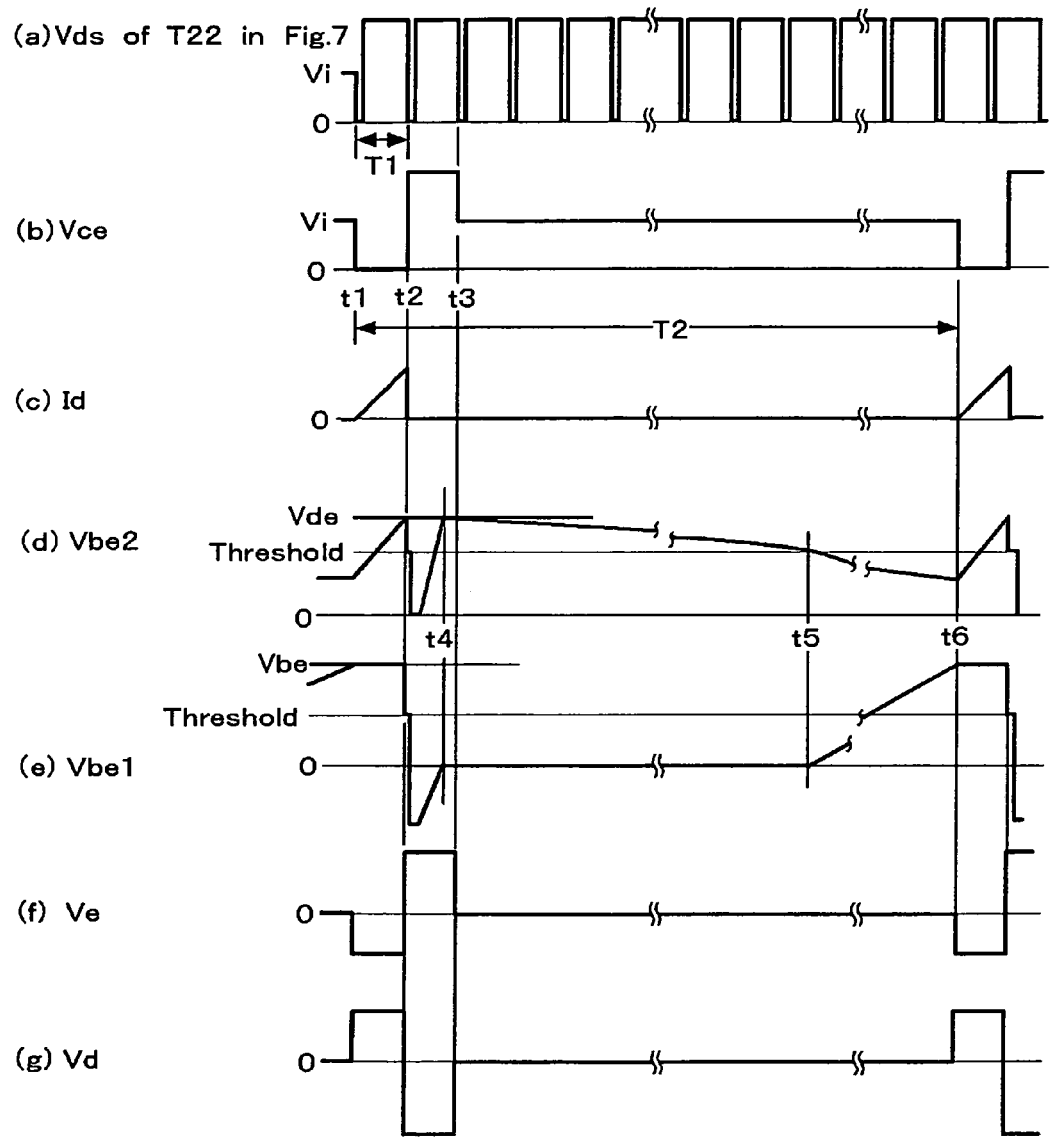
FIG. 12 shows a diagram of operating waves of each part at the non-loading time in FIG. 2.

Next, a method to control the power loss at the non-loading time when the output current approximates 0 A is explained, based on FIG. 12.

The direct-current voltage Vi is applied to the plus terminal 18. Under a condition that a slight current is running even with non-loading, when the first switching element 60 turns on at t1, the Vce becomes 0V as shown in FIG. 12 (b), the current Id runs at the magnetizing coil 63 as shown in FIG. 12 (c). At the same time, the voltage Vd is generated at the drive coil 65 as shown in FIG. 12 (g) and the base current then runs to the first switching element 60 through the resistance 52 and the condenser 51 to maintain the first switching element 60 at the on-state. Moreover, simultaneously, the charging of the timing condenser 55 starts through the charge resistance 53 as in the Vbe2 in FIG. 12 (d). When the base of the second switching element 54 reaches the Vbe at t2, the second switching element 54 turns on to connect the collector with the minus terminal 19 and the base voltage of the first switching element 60 becomes 0V to make the first switching element 60 the off-state. Subsequently, the current Id running at the magnetizing coil 63 becomes 0 A to invert the generated voltage and the Vce of the first switching element 60 then increases as shown in FIG. 12 (b). At the same time, the voltages of the drive coil 65 and the sensing coil 66 also invert as shown in FIGS. 12 (g) and (f). Because the timing condenser 55 is connected with the drive coil 65 whose polarity inverts to a minus voltage through the charge resistance 53, as shown in FIG. 12 (d), the discharge occurs immediately to become 0V and the second switching element 54 turns off.

At that time, the smoothing condenser 58 is charged through the diode 59 from the sensing coil 66 whose polarity inverts and the charging of the timing condenser 55 toward the plus direction starts from the plus side of the condenser 58 through the resistance 57 and the Zener diode 56.

The Zener diode 56 at the ordinary switching time operates with the mode to supply the difference between the detection voltage and the basic voltage of the Zener diode. At the non-loading time, a current from the condenser 58 in the rectifying and smoothing circuit runs only once to charge up the timing condenser 55.

However, when it reaches t4, as shown in FIG. 12 (d), the base voltage of the second switching element 54 becomes the Vbe to turn on, and the base voltage of the first switching element 60 becomes almost 0V, as shown in FIG. 12 (e). Thus, the first switching element 60 maintains the off-state regardless of the voltage of the drive coil 65.

However, the condition is required that t4 when the second switching element 54 turns on at the non-loading time is earlier than t3 when the second switching element 54 turns on at the ordinary switching time (t4<t3). To meet this requirement, the charge speed of the timing condenser 55 from t2 to t4 is adjusted by the time constant determined by the resistance 57 and the voltage of the Zener diode 57 and the content of the timing condenser 55.

The retention time of the on-state of the second switching element 54 persists while the charge accumulated at the smoothing condenser 58 is discharged and the voltage of the timing condenser 57 decreases gradually and the base voltage Vbe of the second switching element 54 then decreases gradually with the reduction of the former voltage and until it becomes t5 with the threshold voltage, as shown in FIG. 12 (d).

Immediately after the voltage becomes the threshold or less, the second switching element 54 turns on and the base voltage of the first switching element 60 increases from 0V gradually as shown in FIG. 12 (e). This is because the condenser 51 is charged up from the direct-current voltage of the plus terminal 18 through the resistance 50, the condenser 51, the resistance 52, and the drive coil 65 (the winding resistance level is approximately 0Ω). When this voltage reaches the Vbe of the first switching element 60 at t6, the first switching element 60 turns on to return to the original condition. As shown in FIG. 12 (b), the cycle of the oscillation with non-loading of the power source in the invention becomes T2, which is designed to be greatly higher than the cycle of the prior switching power source as shown in FIG. 12 (a). Higher the cycle, less the power loss due to the switching loss can become.

The invention claimed is:
1. A switching power supply circuit, comprising:
a first switching element which has a fly-back transformer with a magnetizing coil and a drive coil at the primary side and an output coil at the secondary side and a bipolar transistor applying a voltage from said drive coil for self-oscillation and then magnetizing said magnetizing coil,
a second switching element with a bipolar transistor to control the switching time of the first switching element,
a timing condenser connected between the base and emitter of the second switching element, and supplying the current from said drive coil through an impedance circuit in order to supply the direct-current voltage that is rectified from AC voltage to said magnetizing coil and outputting the voltage from said output coil by switching, and
a sensing coil being connected magnetically closely with said output coil and being connected with a rectifying and smoothing circuit, the rectifying and smoothing circuit being connected with said timing condenser through a Zener diode facing in the inverse direction to the resistance, and the discharge and charge property of said timing condenser being adjusted by resistances connected in series with said Zener diode in order to make the timing for said second switching element to turn on at the non-loading time shorter than that at the ordinary switching time.

2. The switching power supply circuit as claimed in claim 1 wherein the discharge and charge property of the timing condenser is adjusted by the time constant determined by the voltage of the Zener diode, the resistances connected in series with the Zener diode and the content of the timing condenser.

3. A switching power supply circuit, comprising:
   a first switching element with a fly-back transformer having a magnetizing coil and a drive coil at the primary side and an output coil at the secondary side and a first bipolar transistor applying a voltage from said drive coil for self-oscillation and then magnetizing said magnetizing coil,
   a second switching element with a second bipolar transistor to control the switching time of the first switching element,
   a timing condenser connected between the base and emitter of the second switching element, and supplying a current from said drive coil through an impedance circuit comprising a serial circuit of resistances and inductances in order to supply a direct current voltage rectified from AC voltage to said magnetizing coil and outputting said voltage from said output coil by switching, and
   a sensing coil being connected magnetically closely with said output coil and connected with a rectifying and smoothing circuit that in turn is connected with said timing condenser through a Zener diode facing in the inverse direction to the resistance, the difference between a detection voltage detected as a direct current voltage of the secondary side being rectified and smoothed from alternate current voltage output from said sensing coil and the basic voltage of said Zener diode being supplied to said timing condenser for changing the discharge and charge time and then changing the timing of the switching of said second switching element to control the switching time of said first switching element, and the discharge and charge property of said timing condenser being adjusted by resistances connected in series with said Zener diode in order to make the timing for said second switching element to turn on at the non-loading time shorter than that at the ordinary switching time.

4. The switching power supply circuit as claimed in claim 3 wherein the discharge and charge property of the timing condenser is adjusted by the time constant determined by the voltage of the Zener diode, the resistances connected in series with the Zener diode and the content of the timing condenser.

* * * * *